United States Patent [19]

McLean et al.

[11] Patent Number: 4,516,392
[45] Date of Patent: May 14, 1985

[54] CONDITIONING ROLL DRIVE MECHANISM

[75] Inventors: Kenneth W. McLean; John K. Hale, both of New Holland, Pa.

[73] Assignee: Sperry Corporation, New Holland, Pa.

[21] Appl. No.: 585,676

[22] Filed: Mar. 2, 1984

[51] Int. Cl.³ .............................................. A01D 82/00
[52] U.S. Cl. .................................. 56/16.4; 56/DIG. 1
[58] Field of Search ................. 56/13.6, DIG. 1, 16.4, 56/192, 295; 100/89

[56] References Cited

U.S. PATENT DOCUMENTS

| | | | |
|---|---|---|---|
| 3,323,445 | 6/1967 | Bushmeyer et al. | 100/89 |
| 3,386,373 | 6/1968 | Bushmeyer et al. | 100/89 |
| 3,520,250 | 7/1970 | Molitorisz | 100/89 |
| 3,820,311 | 6/1974 | Sawyer et al. | 56/14.4 |
| 4,035,991 | 7/1977 | Oosterling et al. | 56/DIG. 1 |

*Primary Examiner*—Robert P. Swiatek
*Assistant Examiner*—John G. Weiss
*Attorney, Agent, or Firm*—Larry W. Miller; Frank A. Seemar; Darrell F. Marquette

[57] ABSTRACT

A mower-conditioner having a pair of rotatable conditioning rolls cooperable to condition severed crop material passing therebetween is disclosed wherein the bearings rotatably supporting each conditioning roll are recessed into the end of the conditioning roll. The recessed bearings are mounted within a cup-shaped housing, the conditioning roll drive shaft being affixed to a support plate recessed from the end of the conditioning roll to permit the recessed mounting of the bearings. Hexagonal bore bearings and short throated clamp yokes are utilized to eliminate the need for locking devices and minimize the overall transverse width of the mower-conditioner. Timing flanges to permit a timed intermeshing relationship between the conditioning rolls is formed as a part of the conditioning roll drive shaft.

4 Claims, 3 Drawing Figures

CONDITIONING ROLL DRIVE MECHANISM

BACKGROUND OF THE INVENTION

The present invention relates generally to hay harvesting machines, commonly referred to as mower-conditioners, and, more particularly, to improvements in the conditioning roll drive mechanism to permit a reduction in the transverse width of the mower-conditioner.

Mower-conditioners have been provided for the harvesting of hay for a number of years. A mower-conditioner severs standing crop material and conveys the severed crop material rearwardly into a conditioning mechanism without depositing the severed crop upon the ground. The conditioning mechanism has undertaken many forms; however, a preferred embodiment utilizes a pair of generally vertically disposed intermeshing rubber rolls to crimp and/or crush severed crop material passing therebetween. To obtain the most efficient conditioning of the severed hay crop, it is desirable that the transverse width of the conditioning rolls be substantially equal to the transverse width of the cutting mechanism severing the hay crop.

Generally, a mower-conditioner is provided with a drive mechanism transversely disposed of the conditioning and cutting mechanisms. The drive mechanism generally includes a power input shaft connectable to a source of rotational power, a gearbox and associated drive transfer devices connected to the conditioner rolls and the cutting mechanism. Accordingly, the overall transport width of the mower-conditioner is defined by the transverse width of the conditioning rolls and/or cutting mechanism plus the additional width required for the drive mechanism.

To comply with stringent highway regulations in Europe, among other places, it is necessary that the overall transport width of the mower-conditioner not exceed three meters. Because of the spacial location of the conditioning rolls with respect to the gearbox, a mere shortening of the conditioning roll drive shafts to reduce the overall transport width of prior art mower-conditioners, would result in an undesirable universal joint angle for one or both of the drive transfer devices to the conditioning rolls. Accordingly, the problem presented is one of maximizing the transverse width of the conditioning rolls without adversely affecting the drive to the conditioning rolls and maintaining the overall transport width requiremtnts of the mower-conditioner.

SUMMARY OF THE INVENTION

It is an object of this invention to overcome the aforementioned disadvantages of the prior art by providing a mower-conditioner having bearings for rotatably supporting the conditioning rolls recessed within the end of the respective conditioning rolls.

It is another object of this invention to provide a disc mower-conditioner utilizing a three meter disc cutterbar, while maintaining the overall transport width to three meters.

It is still another object of this invention to maximize the transverse width of the conditioning rolls in a mower-conditioner having a restricted overall transport width.

It is yet another object of this invention to maintain an acceptable universal joint angle in the drive line transferring rotational power from the gearbox to the conditioning rolls to maintain a reliable conditioning roll drive.

It is a further object of this invention to recess the bearings rotatably supporting the end of each conditioning roll adjacent the drive mechanism within the end of the conditioning rolls.

It is an advantage of this invention that hexagonal bore bearings can be utilized to eliminate the need for rotational locking devices.

It is a feature of this invention that short throated clamp yokes are utilized in the drive transfer mechanism interconnecting the gearbox and the conditioning rolls.

It is another feature of this invention that a timing flange for the conditioning rolls is formed as part of the drive shaft transferring rotational power from the gearbox to the conditioning roll.

It is still a further object of this invention to provide a conditioning roll having a generally tubular structure with a support plate recessed inside the end of the conditioning roll, generally perpendicular to the axis of rotation thereof, to be affixed to a stub shaft connected to the drive transfer mechanism for rotatably powering the conditioning roll.

It is another advantage of this invention that the bearings supporting the end of the conditioning roll adjacent the drive mechanism is mounted in a cup-shaped housing to permit the bearing to be positioned internally of the conditioning roll.

It is yet a further object of this invention to provide a drive mechanism for the conditioning rolls of a mower-conditioner to maximize the transverse width of the conditioning rolls for a restricted overall transport width of the mower-conditioner and still be durable in construction, inexpensive of manufacture, carefree of maintenance, facile in assemblage, and simple and effective in use.

These and other objects, features and advantages are accomplished according to the instant invention by providing a mower-conditioner having a pair of rotatable conditioning rolls cooperable to condition severed crop material passing therebetween, wherein the bearings rotatably supporting each conditioning roll are recessed into the end of the conditioning roll. The recessed bearings are mounted within a cup-shaped housing, the conditioning roll drive shaft being affixed to a support plate recessed from the end of the conditioning roll to permit the recessed mounting of the bearings. Hexagonal bore bearings and short throated clamp yokes are utilized to eliminate the need for locking devices and minimize the overall transerse width of the mower-conditioner. Timing flanges to permit a timed intermeshing relationship between the conditioning rolls is formed as a part of the conditioning roll drive shaft.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
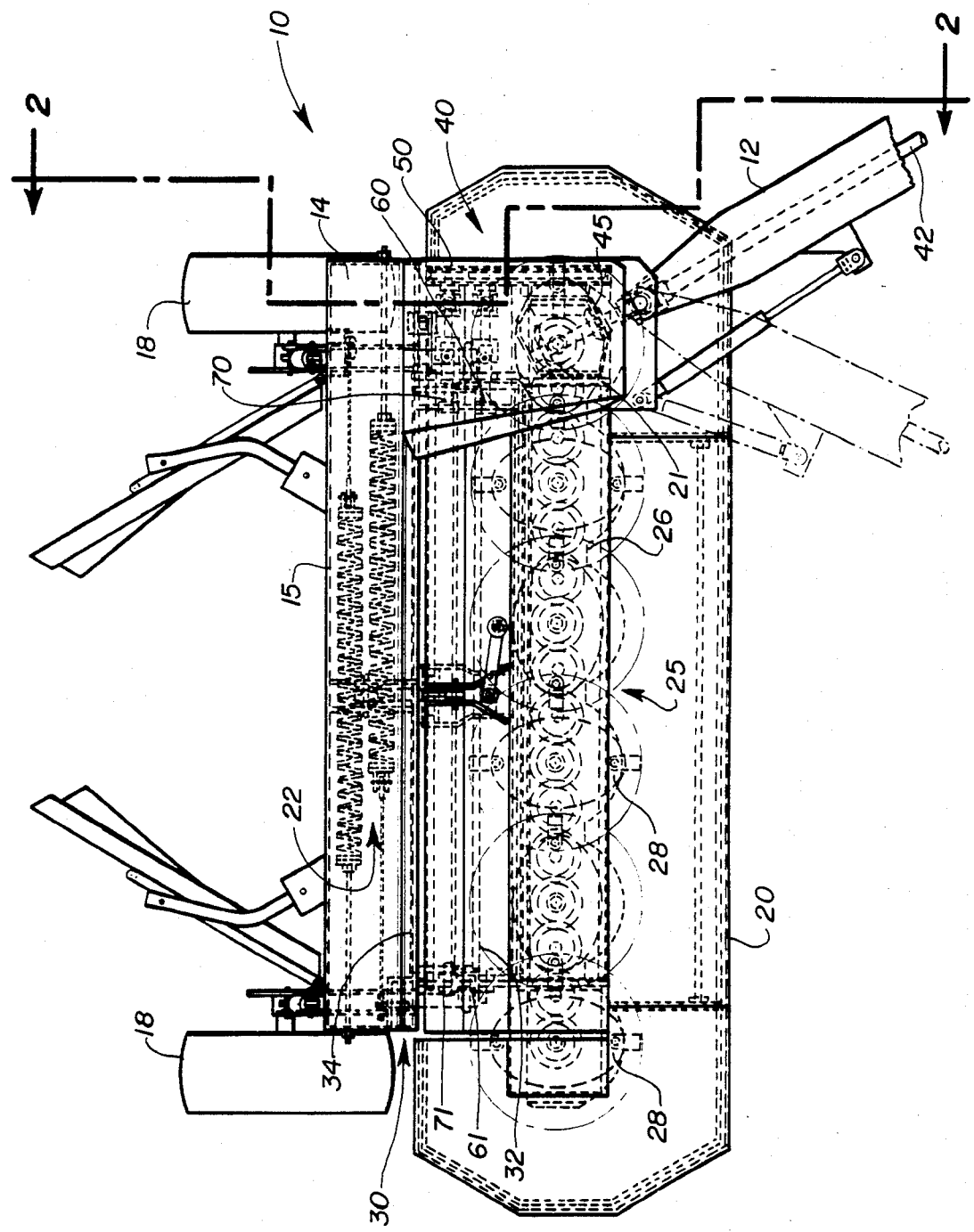
FIG. 1 is a top plan view of a disc mower-conditioner incorporating the principles of the instant invention, a portion of the draft member being broken away.

Referring now to the drawings and, particularly, to FIG. 1, a top plan view of a hay harvesting machine, commonly referred to as a disc mower-conditioner, can be seen. Any left and right references are used as a matter of convenience and are determined by standing at the rear of the mower-conditioner, facing the forward end, the direction of travel. The mower-conditioner 10 is shown in the form of a pull-type machine having a draft member 12 pivotally connected to the frame 14 of the machine 10. The frame 14 includes a main transverse support beam 15 to which are connected downwardly depending legs 17 mounting wheels 18 for mobilely supporting the machine 10 over the ground G, as best seen in FIG. 2.

Figure 2:
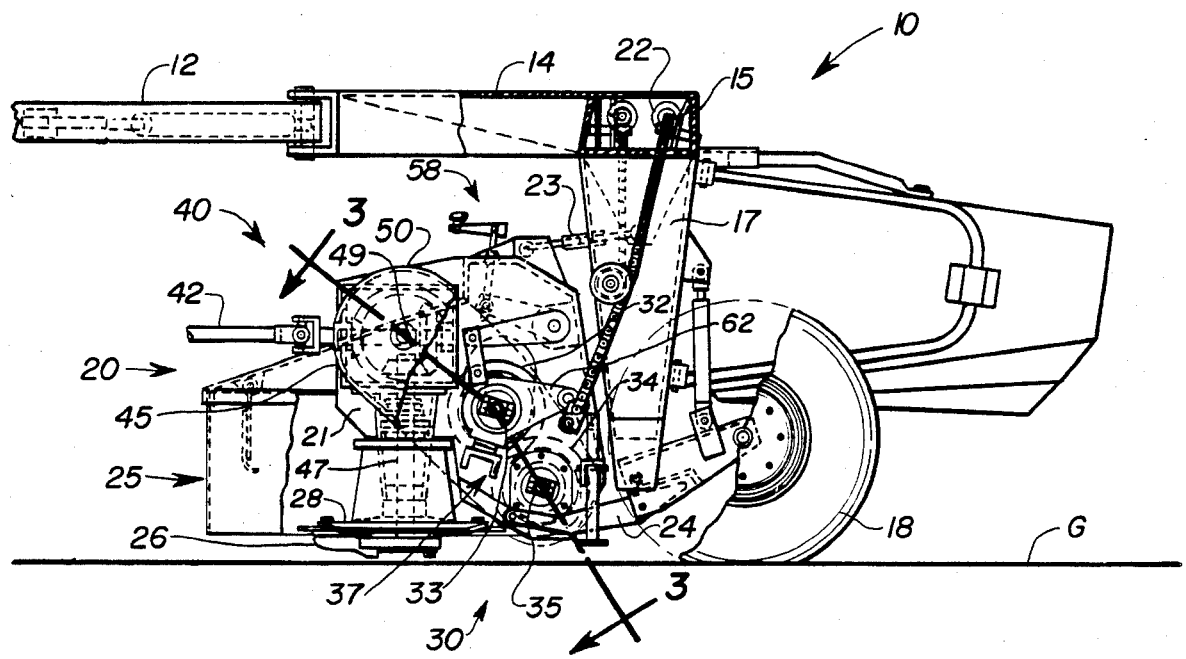
FIG. 2 is a side elevational view of the disc mower-conditioner seen in FIG. 1 with portions being broken away to better show the invention.

Referring to FIGS. 1 and 2, the mower-conditioner 10 includes a crop harvesting header 20 floatingly supported for movement with the ground G relative to the frame 14 by the counterbalancing mechanism 22 and upper and lower links 23, 24 interconnecting the header 20 and the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by an impact action. A conditioning mechanism 30 is mounted in the header 20 rearwardly of the cutting mechanism 25 to receive and condition crop material severed by the cutterbar 26.

The conditioning mechanism 30 includes a pair of cooperable, generally vertically spaced transverse conditioning rolls 32,34 operable to condition severed crop material passing therebetween. Each roll 32,34 is rotatably supported by bearings 60,61 and 70,71, respectively, adjacent opposing sides of the header 20. The axis of rotation 33 of the upper conditioning roll 32 is spaced slightly forwardly of the axis of rotation 35 of the lower conditioning roll 34, so that the nip 37 formed therebetween is facing slightly downwardly toward the disc cutterbar 26. The preferred embodiment of the conditioning roll construction shown in FIGS. 1 and 2 is of the intermeshing lug design.

Figure 3:
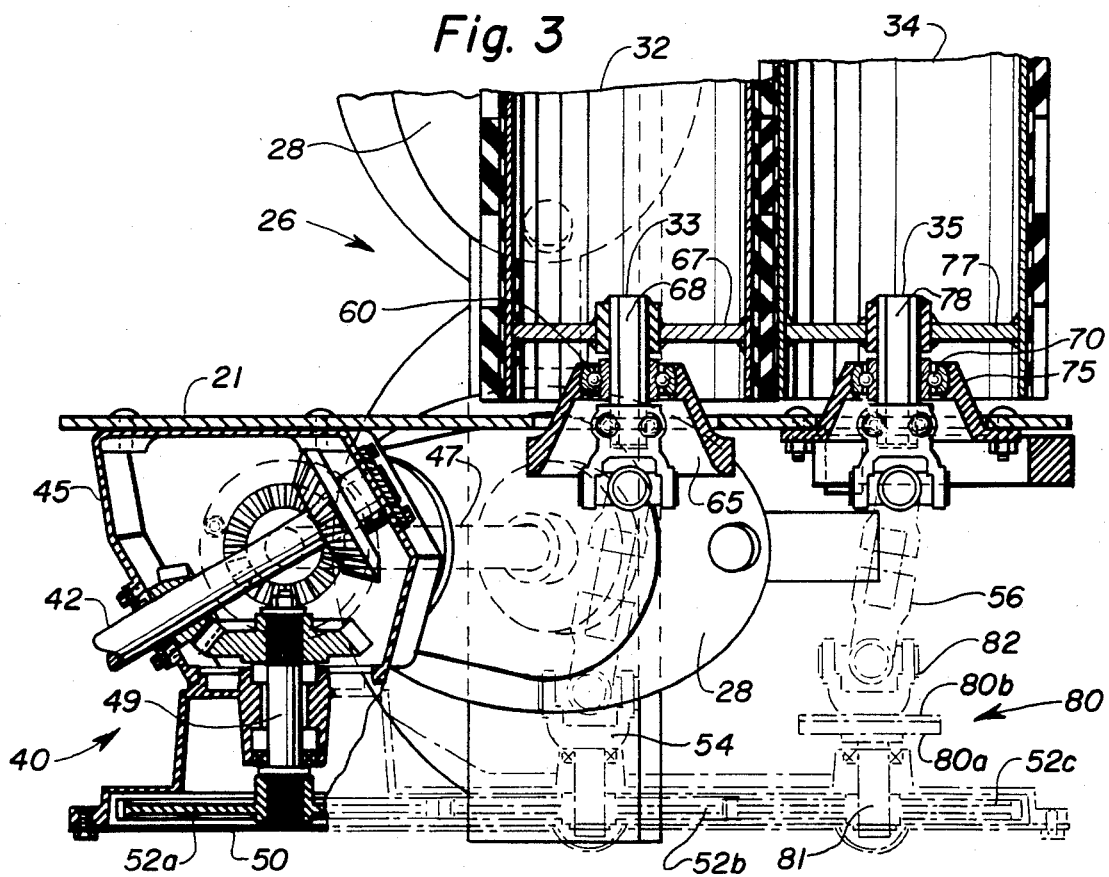
FIG. 3 is an enlarged partial cross-sectional view of the disc mower-conditioner taken along lines 3—3 of FIG. 2, portions of the drive mechanism being shown in phantom for purposes of clarity.

Referring now to FIGS. 1, 2, and 3, the drive mechanism 40 can best be seen. The power input shaft 42 is operably connected to a source of rotational power associated with the prime mover (not shown) attached to the draft member 12. The power input shaft 42 delivers rotational power to a gearbox 45 mounted to the side sheet 21 of the header 20. A first output shaft 47 extends through the bottom of the gearbox 45 to deliver rotational power to the disc cutterbar 26 in a conventional manner. A second output shaft 49 delivers rotational power from the gearbox 45 to a gear casing 50 connected to the gearbox 45, so as to form an integral part thereof. The gear casing 50 rotatably mounts a series of spur gears 52 a,b,c to permit the transfer of rotational power to the conditioning rolls 32,34. A first double universal joint drive transfer line 54 is connected to spur gear 52b, and transfers rotational driving power to the upper conditioning roll 32. A second double universal joint drive transfer line 56 is connected to spur gear 52c and transfers rotational driving power to the lower conditioning roll 34.

To minimize the overall transport width of the mower conditioner 10, the bearings 60,70 rotatably supporting the end of the conditioning rolls 32,34, respectively, adjacent the drive mechanism 40 is recessed internally of the respective conditioning roll 32,34. As is well known in the art, the upper conditioning roll 32 is biased for movement toward the lower roll 34 by a roll biasing mechanism 58 such that slugs of severed crop material can pass between the conditioning rolls 32, 34. Accordingly, the opposing transverse ends of the upper roll 32 are mounted in pivoted arms 62, best seen in FIG. 2, to permit movement of the upper roll 32 toward and away from the lower roll 34. The bearing 60 is mounted within a cup-shaped housing 65 which is affixed to the corresponding pivot arm 62. Similarly, the lower roll bearing 70 is mounted in a cup shaped housing 75 affixed to the side sheet 21 of the header 20.

Each conditioning roll 32,34 is of generally tubular construction and includes a recessed support plate 67,77, respectively, positioned generally perpendicular to the respective axis of rotation 33,35 and internally of the end of the respective roll 32,34. A stub shaft 68,78 is affixed to the respective support plate 67,77, rotatably supported by the respective bearing 60,70 and connected to the respective double universal joint drive transfer line 54,56 to permit a driving rotation of the corresponding conditioning roll 32,34.

As seen in FIG. 3, the utilization of hexagonal bore bearings 60,70 and corresponding hexagonal stub shafts 68,78 eliminates the need for locking devices, such as an eccentric collar and set screw, to fix the position of the stub shaft 68,78 relative to the inner race of the respective bearings 60,70. As best seen in phantom in FIG. 3, a timing flange 80 can be incorporated into the second drive transfer line 56 to permit the proper intermeshing relationship between the upper and lower conditioning rolls 32,34. One half 80a of the timing flange 80 can be integrally formed with the jack shaft 81 affixed to the spur gear 52c, while the other half 80b of the timing gear 80 can be integrally formed with the adjacent universal joint yoke 82 to reduce transverse spacial requirements. The respective halves 80a,80b of the timing flange 80 can be selectively connected to attain the proper timing between the upper and lower rolls 32,34. As also seen in phantom in FIG. 3, the utilization of short throated clamp yokes for the universal joint drive transfer lines also help minimize the overall transport width of the mower-conditioner 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific forms shown. Having thus described the invention, what is claimed is:

1. A hay harvesting machine having a mobile frame defining opposing lateral sides; upper and lower transverse conditioning rolls supported by said frame to condition crop passing therebetween, each said conditioning roll having opposing ends being rotatably mounted by first and second bearings adjacent, respectively, the opposing lateral sides; crop cutting and conveying means supported by said frame to sever standing crop material and convey the severed crop material to said conditioning rolls to be fed therebetween; and drive means for operatively powering said crop cutting and conveying means and the rotation of said conditioning rolls, the improvement comprising:

said conditioning rolls having a generally tubular construction with a support plate recessed inside each respective said conditioning roll and positioned generally perpendicular to the respective axis of rotation, each said support plate having a stub shaft extending therefrom toward the corresponding end of the conditioning roll, the first bearing for each said conditioning roll being mounted in a housing cup, each said stub shaft being rotatably supported by the corresponding said first bearing, each said first bearing being positioned internally of the corresponding said conditioning roll between the corresponding support plate and the respective end of the corresponding conditioning roll, the housing cup for said upper conditioning roll being connected to a biasing means for biasing said upper conditioning roll toward a position relative to said lower conditioning roll.

2. The hay harvesting machine of claim 1 wherein said drive means includes a power input shaft and a gear box housing a plurality of gears drivingly connected to said power input shaft, each respective said stub shaft being drivingly connected to a corresponding gear within said gear box with short-throated clamp yokes.

3. The hay harvesting machine of claim 2 wherein said drive means includes a timing flange to permit selective rotation of said lower roll without effecting rotation of the corresponding gear within said gear box.

4. The hay harvesting machine of claim 3 wherein the gear corresponding to said lower conditioning roll includes a gear shaft, said timing flange having a first half fixed to said gear shaft and a second half fixed to one of said short-throated yokes, said second half of said timing flange being selectively rotatable relative to said first half to permit rotation of said lower conditioning roll relative to said upper conditioning roll, said timing flange halves being connectable to prevent relative movement therebetween during operation of said conditioning rolls.

* * * * *